United States Patent [19]

Sherburne et al.

[11] Patent Number: 5,335,358
[45] Date of Patent: Aug. 2, 1994

[54] SUBSCRIBER INCOMPATIBILITY DISPLAY ARRANGEMENT

[75] Inventors: Timothy J. Sherburne, Elk Grove Village; David J. Ness-Cohn, Lisle; Randy L. Ekl, Palatine, all of Ill.

[73] Assignee: Motorola, Inc., Schaumburg, Ill.

[21] Appl. No.: 284,230

[22] Filed: Dec. 14, 1988

[51] Int. Cl.⁵ .............................................. H04B 7/00
[52] U.S. Cl. .................................. 455/53.1; 455/151.1
[58] Field of Search ............... 455/154, 33, 34, 53, 455/54, 56, 57, 58, 53.1, 151.1

[56] References Cited

U.S. PATENT DOCUMENTS

| | | | |
|---|---|---|---|
| 3,774,113 | 11/1973 | Chasek | 455/154 |
| 4,232,301 | 11/1980 | Nomoto | 455/154 |
| 4,737,977 | 4/1988 | Norman | 455/54 |

*Primary Examiner*—Douglas W. Olms
*Attorney, Agent, or Firm*—Wayne J. Egan

[57] ABSTRACT

A method is disclosed, and an apparatus described, for providing a console display indicating the incompatibility of a subscriber with a talk group in an RF communication system. The console provides a first display as long as the system detects no subscriber incompatibility with a talk group. When the system determines the subscriber is incompatible with a talk group, however, the console provides a second display which is graphically distinct from the first display. The second display is further arranged so the incompatible subscriber can readily be identified.

18 Claims, 1 Drawing Sheet

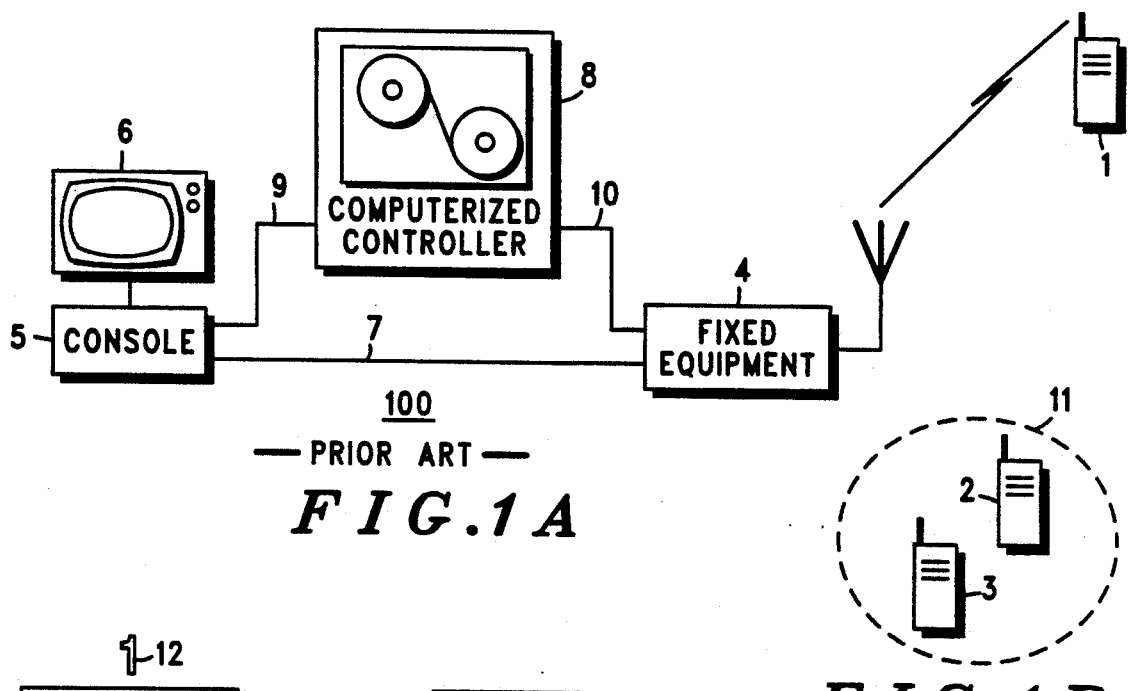
FIG.1A —PRIOR ART—
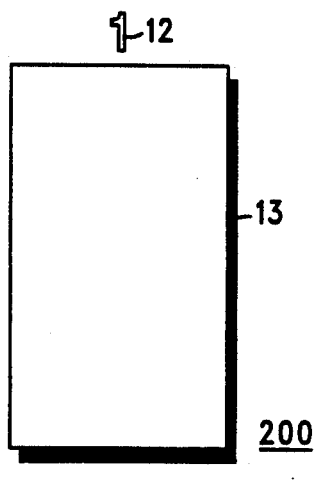
FIG.2
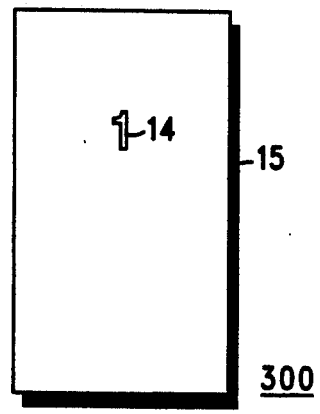
FIG.3
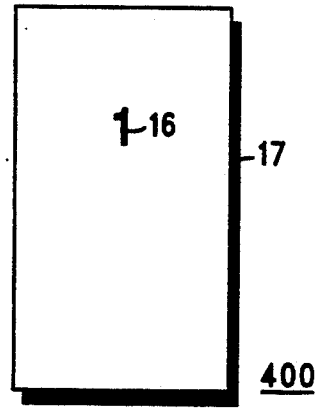
FIG.4
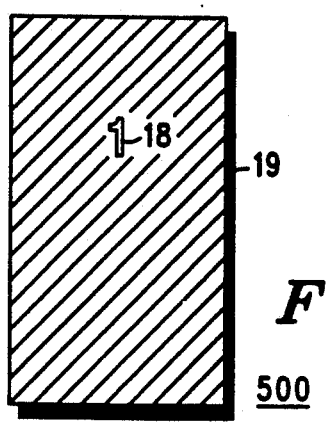
FIG.5

5,335,358

SUBSCRIBER INCOMPATIBILITY DISPLAY ARRANGEMENT

BACKGROUND OF THE INVENTION

This invention pertains to trunked radio frequency (RF) communication systems or, more particularly, to a method of displaying subscriber incompatibilities with talk groups in trunked RF communication systems.

Modern-day radio frequency (RF) trunked communication systems can be understood with reference to FIGS. 1A and FIG. 1B, which depicts a typical RF communication system (100) arranged with a console (5). As shown, the RF communication system (100) includes fixed equipment (4) arranged to facilitate communication between several subscribers 1 (1), 2 (2) and 3 (3). The console (5) is equipped with a display (6) and connected to the fixed equipment by means of a first suitable link (7). Also shown is a computerized controller (8) connected to the console by means of a second suitable link (9) and connected to the fixed equipment by means of a third suitable link (10).

Those skilled in the art will appreciate that one of the functions of the console typically is to assign subscribers to talk groups. Once a particular subscriber is a member of a particular talk group, the subscriber can readily communicate with other subscribers in the same talk group. Referring to the figure, subscribers 2 and 3, depicted in FIG. 1B, are members of talk group A (11), whereas subscriber 1, depicted in FIG. 1A, is not.

Those skilled in the art will appreciate that not all subscribers are compatible with all talk groups. For example, assume subscribers 2 (2) and 3 (3) are capable of data communication, while subscriber 1 (1) is not. Assume also that talk group A (11) has been established for the sole purpose of supporting a data communication session. In this example, subscribers 2 (2) and 3 (3), being capable of data communication, may be members of talk group A (11), as shown, while subscriber 1 (1), being incapable of data communication, cannot be a participating member of talk group A (11).

With modern RF communication systems becoming increasingly large and complex, those skilled in the art will appreciate that, from time to time, a console operator may inadvertently assign an incompatible subscriber to a talk group. Those skilled in the art will also appreciate that, even though a console operator may initially assign a compatible subscriber to a talk group, the subscriber may later become incompatible with the talk group due to subsequent re-arrangements or changes made within the system.

As a result, the inventor has discovered it is difficult for operators of modern RF communication systems to administer the compatibility of a substantial number of subscribers with a corresponding number of talk groups. While prior RF communication systems have provided computerized control systems that enabled the console operator to determine the compatibility of a subscriber with a talk group, the inventor has discovered it would be particularly useful if the RF communication system provided a console display of the compatibility of a subscriber with a talk group.

SUMMARY OF THE INVENTION

Therefore, according to the invention, a method is provided and an apparatus described for providing a console display indicating the compatibility of a subscriber with a talk group in a RF communication system.

In the preferred embodiment, the console provides a first display including a symbol representing the subscriber (the "first subscriber symbol") and a symbol representing the talk group (the "first talk group symbol"). With this arrangement, the first subscriber symbol is displayed within the first talk group symbol whenever the subscriber is assigned to the talk group.

The console provides a second display whenever the subscriber is a member of the talk group and the subscriber is, or becomes, incompatible with the talk group. This second display includes a symbol representing the subscriber (the "second subscriber symbol") and a symbol representing the talk group (the "second talk group symbol"), with the second subscriber symbol displayed within the second talk group symbol. The console may also provide an audible signal, such as a gong, buzzer or bell, to alert the console operator to the presence of the second display.

Further, the second display presents the second subscriber symbol as a highlighted version of the first subscriber symbol of the first display to graphically indicate to the console operator that the associated subscriber is presently incompatible with the talk group. Also, the second display presents the second talk group symbol as a reverse-video version of the first talk group symbol of the first display to graphically indicate to the console operator that the associated talk group presently contains an incompatible subscriber.

BRIEF DESCRIPTION OF THE DRAWINGS

FIG. 1A depicts a typical RF communication system arranged with a console, as in the prior art.

FIG. 1B depicts several subscriber units.

FIG. 2 depicts a display of the present invention, the display being arranged to indicate that subscriber 1 is not a member of talk group A.

FIG. 3 depicts a display of the present invention, the display being arranged to indicate that subscriber 1 is a member of talk group A.

FIG. 4 depicts a first embodiment of a display of the present invention, the display being arranged to indicate that subscriber 1 is a member of talk group A and that subscriber 1 is incompatible with talk group A.

FIG. 5 depicts a second embodiment of a display of the present invention, the display being arranged to indicate that subscriber 1 is a member of talk group A and that subscriber 1 is incompatible with talk group A.

DETAILED DESCRIPTION OF THE INVENTION

The subscriber incompatibility display arrangement is shown in FIGS. 2, 3, 4 and 5. In what follows, it will be assumed that a hypothetical RF communication system having a console and subscriber i and talk group A is arranged with the present invention.

Referring to FIG. 2, the figure shows a display similar to that which the operator would see at a point in time when subscriber 1 is not a member of talk group A. This display is arranged to indicate that subscriber 1 is not a member of talk group A.

In FIG. 2, subscriber 1 is represented by the numeral 1 (12) and talk group A is represented by the rectangle labelled "Talk Group A" (13). The fact that subscriber 1 is not a member of talk group A is indicated here by the numberal 1 (12) representing subscriber 1 being situated outside the rectangle labelled "Talk Group A" (13) representing talk group A.

Referring to FIG. 3, the figure shows a display similar to that which the operator would see at a point in time when subscriber 1 is a member of talk group A and the system has not determined that subscriber 1 is presently incompatible with talk group A. This display is arranged to indicate that subscriber 1 is a member of talk group A.

In FIG. 3, subscriber i is represented by the numeral 1 (14) and talk group A is represented by the rectangle labelled "Talk Group A" (15). The fact that subscriber 1 is a member of talk group A is indicated here by the numeral 1 (14) representing subscriber 1 being situated inside the rectangle labelled "Talk Group A" (15) representing talk group A.

Referring to FIG. 4, this figure shows a first embodiment of a display similar to that which the operator would see at a point in time when subscriber 1 is a member of talk group A and the system has determined that subscriber 1 is presently incompatible with talk group A. This display is arranged to indicate that subscriber 1 is a member of talk group A and that subscriber 1 is incompatible with talk group A.

In FIG. 4, subscriber 1 is represented by the numeral 1 (16) and talk group A is represented by the rectangle labelled "Talk Group A" (17). The fact that subscriber 1 is a member of talk group A is indicated here by the numeral I (16) representing subscriber 1 being situated inside the rectangle labelled "Talk Group A" (17) representing talk group A. The fact that subscriber 1 is incompatible with talk group A is indicated here by the numeral 1 (16) representing subscriber 1 being highlighted.

Referring to FIG. 5, this figure shows a second embodiment of a display similar to that which the operator would see at a point in time when subscriber 1 is a member of talk group A and the system has determined that subscriber 1 is presently incompatible with talk group A. This display is arranged to indicate that subscriber I is a member of talk group A and that subscriber 1 is incompatible with talk group A.

In FIG. 5, subscriber 1 is represented by the numeral 1 (18) and talk group A is represented by the rectangle labelled "Talk Group A" (19). The fact that subscriber 1 is a member of talk group A is indicated here by the numeral 1 (18) representing subscriber 1 being situated inside the rectangle labelled "Talk Group A" (19) representing talk group A. Also, the fact that subscriber 1 is incompatible with talk group A is indicated here by the numeral 1 (18) representing subscriber 1 being highlighted.

This display is further arranged to indicate that talk group A contains an incompatible subscriber by the rectangle labelled "Talk Group A" (19) representing talk group A being presented in reverse video. This reverse-video presentation of the rectangle labelled "Talk Group A" (19), coupled with the highlighted presentation of the numeral 1 (18), also provides a more graphical indication that subscriber 1 is incompatible with talk group A.

I claim:

1. In a console having a display and being operably connected to at least one RF communication system having several subscribers and at least one talk group and wherein at least one of said several subscribers in incompatible with at least one talk group, said console being constructed and arranged for assigning subscribers to talk groups, a method of assigning a particular subscriber to a particular talk group, comprising the steps of:
    (a) assigning said particular subscriber to said particular talk group;
    (b) displaying a first subscriber symbol representing said particular subscriber and a first talk group symbol representing said particular talk group;
    (c) determining if said particular subscriber is incompatible with said particular talk group; and
    (d) responsive to the result of step (c), indicating that said particular subscriber is incompatible with said particular talk group.

2. The method of claim 1 wherein said first subscriber symbol is contained substantially within said first talk group symbol.

3. The method of claim 2 wherein step (c) includes visually indicating that said particular subscriber in incompatible with said particular talk group.

4. The method of claim 3 wherein step (c) includes altering said first subscriber symbol to form a second subscriber symbol.

5. The method of claim 4 wherein said second subscriber symbol comprises a highlighted version of said first subscriber symbol.

6. The method of claim 5 wherein step (c) includes altering said first talk group symbol to form a second talk group symbol.

7. The method of claim 6 wherein said second talk group symbol substantially comprises a reverse-video version of said first talk group symbol.

8. The method of claim 7 wherein said at least one RF communication system includes at least one trunked communication system.

9. The method of claim 5 wherein said at least one RF communication system includes at least one trunked communication system.

10. A console having a display and being operably connected to at least one RF communication system having several subscribers and at least one talk group and wherein at least one of said several subscribers is incompatible with at least one talk group, said console comprising:
    assigning means for assigning a particular subscriber to a particular talk group;
    displaying means responsive to said assigning means for displaying a first subscriber symbol representing said particular subscriber and a first talk group symbol representing said particular talk group;
    determining means responsive to said assigning means for determining if said particular subscriber is incompatible with said particular talk group; and
    indicating means responsive to said determining means for indicating that said particular subscriber is incompatible with said particular talk group.

11. The console of claim 10 wherein said first subscriber symbol is contained substantially within said first talk group symbol.

12. The console of claim 11 wherein said indicating means includes means for visually indicating that said particular subscriber is incompatible with said particular talk group.

13. The console of claim 12 wherein said indicating means includes means for altering said first subscriber symbol to form a second subscriber symbol.

14. The console of claim 13 wherein said second subscriber symbol comprises a highlighted version of said first subscriber symbol.

15. The console of claim 14 wherein said indicating means includes means for altering said first talk group symbol to form a second talk group symbol.

16. The console of claim 15 wherein said second talk group symbol substantially comprises a reverse-video version of said first talk group symbol.

17. The console of claim 16 wherein said at least one RF communication system includes at least one trunked communication system.

18. The console of claim 14 wherein said at least one RF communication system includes at least one trunked communication system.

* * * * *